United States Patent [19]

Dammann

[11] Patent Number: 4,803,245

[45] Date of Patent: Feb. 7, 1989

[54] FLEXIBILIZED PHENOL/MERCAPTO RESINS AND THEIR SYNTHESIS

[75] Inventor: Laurence G. Dammann, Westerville, Ohio

[73] Assignee: Ashland Oil, Inc., Ashland, Ky.

[21] Appl. No.: 27,008

[22] Filed: Mar. 17, 1987

[51] Int. Cl.$^4$ .................... C08G 18/06; C08G 59/12; C08G 63/08; C08G 63/46

[52] U.S. Cl. .................... 525/123; 525/131; 525/438; 525/440; 525/450; 525/474; 525/476; 525/535; 525/537; 525/528

[58] Field of Search ............. 525/528, 131, 123, 438, 525/440, 450, 476, 474, 535, 537

[56] References Cited

U.S. PATENT DOCUMENTS

| | | | |
|---|---|---|---|
| 3,789,044 | 1/1974 | Taft et al. | 528/53 |
| 3,817,918 | 6/1974 | Aufdermarsh, Jr. | 525/528 |
| 3,836,491 | 9/1974 | Taft et al. | 528/53 |
| 4,035,273 | 7/1977 | McGinniss | 525/528 |
| 4,130,522 | 12/1978 | McGinniss | 525/528 |
| 4,331,782 | 5/1982 | Linden | 528/53 |
| 4,343,839 | 8/1982 | Blegen | 525/440 |
| 4,366,193 | 12/1982 | Linden et al. | 528/53 |
| 4,540,766 | 9/1985 | Chang et al. | 528/45 |
| 4,552,814 | 11/1985 | Cavitt et al. | 525/528 |
| 4,602,071 | 7/1986 | Wellner et al. | 525/528 |
| 4,608,313 | 8/1986 | Hickner et al. | 525/528 |
| 4,732,945 | 3/1988 | Dammann | 525/350 |

FOREIGN PATENT DOCUMENTS 1351881  5/1974  United Kingdom .

*Primary Examiner*—John C. Bleutge
*Assistant Examiner*—Robert E. L. Sellers, II
*Attorney, Agent, or Firm*—Mueller and Smith

[57] ABSTRACT

Disclosed is a method for improving the flexibility of a phenol or mercapto resin wherein an aliphatic hydroxyl-functional polyol or polyepoxide component is partially capped with a phenol or mercapto capping agent followed by chain extension with a polyisocyanate under reaction conditions wherein said polyisocyanate substantially selectively reacts with aliphatic hydroxyl groups or epoxy groups residual from the prior step of the process. The ratio of components is such that a resin predominating in one or more of the following general structures is produced:

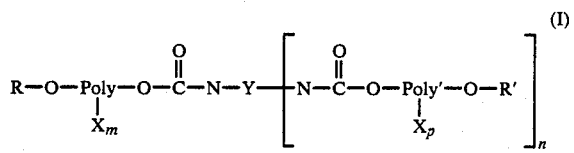

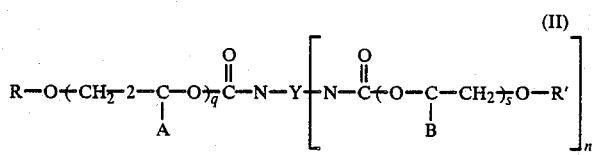

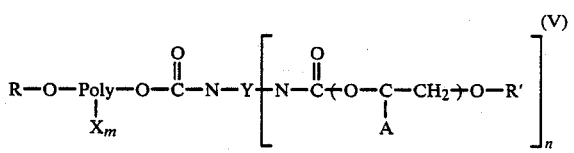

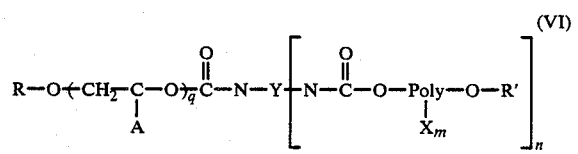

where,

R and R' each is a phenol functional group or a mercapto functional group,

A and B each is an organic chain residue of said component containing functionality epoxy, Poly and Poly' each is an organic chain residue of said component containing aliphatic hydroxy functionality, X is an aliphatic hydroxyl group, the wavy line represents an organic chain residue of said polyisocyanate, n is 1–4, m and p each is 0–2, and q and s each is 1–15.

16 Claims, No Drawings

FLEXIBILIZED PHENOL/MERCAPTO RESINS AND THEIR SYNTHESIS

BACKGROUND OF THE INVENTION

The present invention relates to the synthesis of phenol-functional or mercapto-functional resins and more particularly to a selective resin synthesis for flexibilizing such resins.

Vapor permeation curable coatings traditionally are a class of coatings formulated from aromatic hydroxyl-functional polymers and multi-isocyanate cross-linking agents wherein an applied film thereof is cured by exposure to a vaporous tertiary amine catalyst. More recently, the use of mercapto resins in vapor permeation curing of coatings is taught in commonly-assigned application U.S. Ser. No. 06/905,700 filed on Sept. 9, 1986, now U.S. Pat. No. 4,753,825. In order to contain and handle the vaporous tertiary amine catalyst economically and safely, curing chambers were developed. Curing chambers typically are substantially empty boxes through which a conveyor bearing the coated substrate passes and in which the vaporous tertiary amine, normally borne by an inert gas carrier, contacts such coated substrate. The use of aromatic hydroxy-functional polymers is recommended if an extended pot life system is required. If two-pack formulations are acceptable, then use of aliphatic hydroxyl-functional resins can be made. Multi-isocyanate cross-linking agents in traditional vapor permeation curable coatings contain at least some aromatic isocyanate groups in order for practical cure rates to be achieved.

Such traditional vapor permeation curable coatings requirements have been altered to a degree by the vaporous amine catalyst spray method disclosed by Blegen in U.S. Pat. No. 4,517,222. Such vaporous catalyst spray method relies on the concurrent generation of an atomizate of a coating composition and a carrier gas bearing a catalytic amount of a vaporous tertiary amine catalyst. Such generated atomizate and vaporous catalytic amine-bearing carrier gas flow are admixed and directed onto a substrate to form a film thereover. Curing is rapid and use of a curing chamber is not required. Moreover, all aliphatic isocyanate curing agents can be utilized in such spray process. Aromatic hydroxyl groups on the resin, however, still are required.

One drawback to the requirement of aromatic hydroxyl groups on the resin is the inherent limitation which such aromaticity provides in formulating high solids coatings. The same is true of the requirement of aromaticity in the multi-isocyanate cross-linking agent. Such non-volatile solids content restriction even applies to the vaporous amine catalyst spray method described above.

Yet, despite the foregoing limitations which arise by virtue of the use of phenolic hydroxyl groups, aliphatic hydroxyl groups are not sufficiently responsive to vapor permeation cure to permit early film development. That is, a prime advantage of vapor permeation curable coatings is that they rapidly develop very early film properties so that the coated part can be handled on the coatings line without fear of damage to the coating. Over the long term, aliphatic hydroxyl groups will fully cure with the polyisocyanate cross-linking agents, through extended cure times means that early handling of the coated part is lost.

With respect to phenolic functional resins and mercapto-functional resins, the requisite phenol or mercapto functionality most frequently is introduced into the resin by coating techniques involving the reaction of a carboxyl-functional capping agent with hydroxyl or equivalent functionality on the resin backbone. Such capping synthesis predominates in the art since most phenol/mercapto capping agents are readily synthesized to contain carboxyl functionality. The introduction of different functionalities into the phenol/mercapto capping agent can cause difficulties in stability or later reaction of such capping agents. U.S. Pat. Nos. 4,331,782 and 4,366,193 form adducts from carboxyl-functional capping agents which adducts contain both phenol functionality and aliphatic hydroxyl functionality. The use of such capping agent adducts still would require functionality on the resin reactive with aliphatic hydroxyl groups, which functionality most typically is carboxyl in nature.

Some coatings applications require flexibility from the resin, e.g. the coating of flexible plastic substrates such as reaction injection molding (RIM) urethanes or the like. One method for flexibilizing polyester or like resins involves their chain extension with polyisocyanates. The introduction of urethane linkages into the polymer backbone allows the formulation of more flexible coatings with the same cross-link density compared to a comparable polymer of the same molecular weight. The introduction of urethane linkages into the polymer backbone, though, is not a task without problems. For example, British Pat. No. 1,351,888 calls for the formation of a hydroxy urethane resin formed by the reaction of an excess of polyol with polyisocyanate, which hydroxy urethane resin then is reacted with a phenolaldehyde condensate (capping agent). The problem with such a proposal is that the capping is run after the isocyanate chain extension step. Side reactions and/or degradation of the resin are real risks in such a synthesis technique. In addition, one is limited to the use of phenol-aldehyde condensate capping agents. If phenol or mercapto functional carboxylic acid capping agents are used to cap a hydroxy urethane resin, problems also are encountered. The capping step is run at a high temperature (180°–220° C.) for extended periods of time (4–12 hours). These severe reaction conditions are determinental to the stability of the urethane linkages introduced into the backbone. Accordingly, a more general and useful synthesis technique would be useful in formulating isocyanate-flexibilized phenol/mercapto resins.

BROAD STATEMENT OF THE INVENTION

Broadly, the present invention is directed to a new synthesis wherein an oligomer or polymer is partially capped to form a phenolic or mercapto functional adduct which also contains aliphatic hydroxyl functionality. The resulting adduct then is reacted with a polyisocyanate for chain extension of the adduct. The resulting phenolic functional or mercapto-functional flexibilized resins are useful in formulating more flexible coatings at the same cross-link density compared to a polymer of the same molecular weight which has not been chain extended.

The sequential synthesis of the present invention utilizes a ratio of ingredients to produce a resinous mixture predominating in one of the following general structures, depending upon whether an aliphatic hydroxyl-functional polyol or an epoxy-functional material is used in the synthesis:

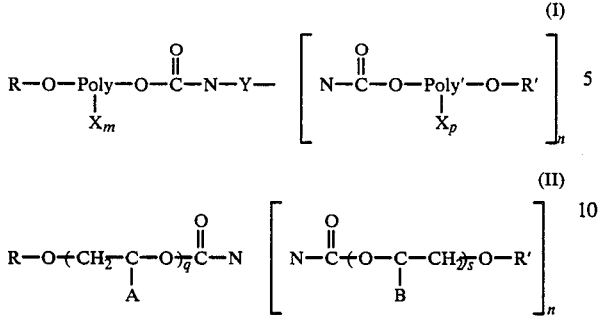

where,
- R and R' each is a phenol functional group or a mercapto functional group,
- A and B each is an organic chain residue of said component containing epoxy functionality,
- Poly and Poly' each is an organic chain residue of said component containing aliphatic hydroxyl functionality,
- X is an aliphatic hydroxyl group,
- Y represents an organic chain residue of said polyisocyanate,
- n is 1–4,
- m and p each is 0–2, and
- q and s each is 1–15.

Resinous mixtures predominating in the foregoing general structures comprise another aspect of the present invention.

Advantages of the present invention include the ability to synthesize a resinous product containing phenolic or mercapto functionality and which has been flexibilized. Another advantage is that the synthesis is readily controlled and highly selective. A further advantage is a resinous product which is ideally suited for formulating coatings for use on flexible sustrates. Yet another advantage is a controlled, selective synthesis which is reproduceable on a large commercial scale. These and other advantages will be readily apparent to those skilled in the art based upon the disclosure contained herein.

DETAILED DESCRIPTION OF THE INVENTION

As discussed above, the selective synthesis of the present invention comprises a multi-step process wherein a resinous material initially is partially capped to produce an adduct containing phenolic functionality or mercapto functionality, and containing aliphatic hydroxyl functionality or aliphatic hydroxy/epoxy functionality. Partial capping for present purposes comprehends the formation of a resinous mixture containing both phenolic hydroxyl/mercapto groups and containing aliphatic hydroxyl groups. The partial capping step of the synthesis is a problem which has been addressed to a degree in the past, as will be more fully discussed below. Variations in products formed by various partial capping techniques, though, can produce a mixture which contains significant quantities of by-product. Such by-product formation, however, may not be deleterious to the inventive synthesis as most by-product materials contain functionality reactive in either the isocyanate chain extension step of the synthesis, or in the curing of the chain extended or flexibilized resins of the present invention. Thus, the language "predominating in" is appropriate in describing the ultimate reaction products of the synthesis of the present invention.

The next step of the synthesis involves the chain extension of the partially capped adduct for producing a more flexible resinous product than an equivalent weight adduct resinous product. Surprisingly, the chain extension step of the process has been found to be quite selective by control of reaction conditions so that the isocyanate groups preferentially react with aliphatic hydroxyl functionality present in the adduct to the exclusion of phenol or mercapto functionality. Amplification on this step of the synthesis is set forth below.

Advantageous structures of the predominant resinous products of the synthesis of the present invention are set forth below:

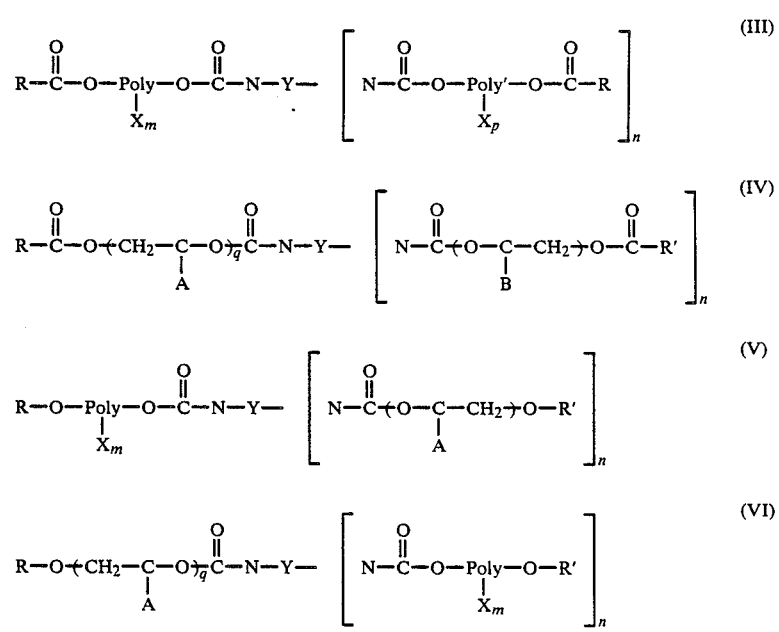

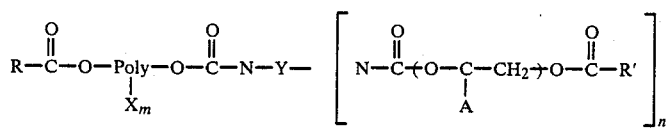

(VII)

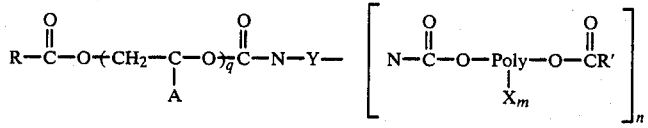

(VIII)

The synthesis of the foregoing advantageous resins will become quite apparent based on the detailed description of the synthesis set forth below.

As described above, the synthesis is initiated by the partial capping of an aliphatic hydroxyl-functional polyol or an epoxy-functional compound with a capping agent which bears phenol or mercapto functionality and bears functionality reactive with the polyol or polyepoxide material. Referring initially to partial capping of a polyol, it will be appreciated that a wide variety of monomers, oligomers, or polymers bearing a multiplicity of hydroxyl groups can be envisioned readily and are well known in the coatings field. Such materials can be based on polyesters, acrylic resins, vinyl resins, polyether resins, silicone resins, polycaprolactone-based resins, alkyd resins, polyolefins, polysulfide resins, polysulfone resins, and the like. Generally, such materials will contain from about 2 to 4 hydroxyl groups per molecule for use in the partial capping synthesis step.

Capping agents for partially capping such polyols preferably contain carboxyl functionality for accomplishing the partial capping step because such materials are most readily available. Carboxyl-functional capping agents can be monomeric, oligomeric, or even polymeric on occasion. Suitable monomeric capping agents include, for example, diphenolic acid, hydroxybenzoic acids (e.g. para-hydroxy benzoic acid, meta-hydroxy benzoic acid, and ortho-hydroxy benzoic acid or salicyclic acid), thiosalicylic acid, mercapto acetic acid, mercapto propionic acid, para-hydroxy phenyl acetic acid and the like and mixtures thereof. Alternatively, capping agents can be formed between, for example, a dimercapto compound, and a compound containing carboxyl functionality and functionality reactive with a mercapto group, such as ethylenic unsaturation or the like. A variety of reaction schemes can be envisioned for forming such specialty adduct capping, though for economy monomeric capping agents are preferred.

The selective capping synthesis of a polyol involves the reaction of the carboxyl capping agent therewith under reaction conditions and for a time such that the capping agent reacts selectively with the aliphatic hydroxyl groups of the polyol. Reaction temperatures for this step of the synthesis broadly comprehend temperatures ranging from about 150° to 230° C. and advantageously between about 180° and 220° C. Reaction times, correspondingly, range from about 30 minutes to 12 hours with reaction times ranging from about 4 to 8 hours being preferred. It will be appreciated by those skilled in the art that, even though the ratio of reactants is such that partial capping is the object of the esterification reaction, by-product formation is expected. Thus, statistically, about 50% of the polyol content can be partially capped as desired, about 25% can be fully capped, and less than about 25% can have substantially no capping. Such is not an unexpected result from the partial capping step of the synthesis. Note that the by-products formed are not deleterious to the ultimate resin formation as such by-products still contain functionality reactive with a polyisocyanate in the formulation of urethane coatings, caulks, adhesives, sealants, foundry binders, or like applications. Thus, the "predominating in" language used in describing the reaction products which desirably, from this step of the synthesis, is a partially capped polyol, e.g. for synthesis of resin structures I and III.

With respect to structures I and III, it will be appreciated that when a pure polyol is partially capped, Poly and Poly' are the same, as are R and R' when a pure capping agent is used. It should be appreciated, though, that a blend of polyols can be subjected to the partial capping step which would result in Poly and Poly' being different. The same goes for R and R' which may be different when a blend of capping agents is used. Under such circumstances of partially capping a blend, a raft of adducts will be formed depending upon the ratio of ingredients subjected to this step of the synthesis. While separation techniques can be practiced for removal of some by-products, typically such processing is not required.

Also, it will be appreciated that a pure polyol and/or polyol blend can be separately capped and the resulting adducts blended for subjecting to chain extension in the next step of the reaction synthesis. Thus, truly unique adducts can be made by the partially capping step of the synthesis.

As an alternative to the straightforward use of a carboxyl capping agent, a multi-step capping process can be practiced for synthesizing adduct capping agents. Thus, the epoxy/hydroxy benzoic acid adduct of U.S. Pat. No. 4,331,782 can be prepared and then reacted with a dibasic acid or dicarboxylic acid functional material concurrently or consecutively then with a polyol for forming a capped adduct equivalent to a capped adduct directly synthesized as outlined above. Such multi-step synthesis is included in the partial capping step of the synthesis of the present invention.

The partial capping step of the synthesis also can be conducted utilizing a polyepoxide material which can be capped with a capping agent, such as a carboxyl capping agent as described above. A wide variety of epoxy-functional monomers, oligomers, or polymers can be readily envisioned for subjecting to the partial capping step of the synthesis. Such polyepoxide materials can be derived from epoxy and epoxy-modified digylcidyl ethers of bis-phenol A structures, various aliphatic polyethylene or polypropylene glycol (diglycidyl ether) adducts, glycidyl ethers of phenolic resins, and glycidyl esters, such epoxy resins being commercially available and commonly used in the coatings field. Of course, as described above with respect to the polyol partial capping step, use of a pure epoxy material would result in A and B of structures II and IV being the same. Use of a pure capping agent would result in R and R' being the same also. However, it will be appreciated that use of a blend of epoxy materials would result in A and B being different as would the use of a blend of capping agents result in R and R' being different. Thus, the use of a pure epoxy material, or a blend of epoxy materials, is appropriate for this step of the process, as is the blending of separately capped epoxy materials.

Reaction temperatures for this synthesis step broadly comprehend temperatures ranging from about 75° to 175° C. and advantageously between about 140° and 160° C. Reaction times, correspondingly, range from about 15 minutes to about 3 hours with reaction times ranging from about 1-2 hours being preferred. As described above with respect to the polyol partial capping step, a mixture of products also can be expected to result from the epoxy partial capping step, depending upon substituents A and B to a large extent. Much higher selectivities can be realized for formation of the preferred partially capped adduct when A and B provide substantial steric hindrance in the reaction. Use of simple epoxides such as ethylene oxide or propylene oxide, for example, would result in an adduct mixture containing subtantial by-product formation. For that matter, substituents A and B also may be formed on the carbon atom beta to the oxygen chain atom within the parenthesis in structures II and IV, as those skilled in the art will appreciate. The location of substituents A and B in the structures is indicative of that structure which most likely occurs in this reaction, though such position is not exclusive nor a limitation on the present invention. Also, rather than use of a capping agent directly, a multi-step process also can be envisioned, as described above.

Another reactant suitable for selective capping is an epoxyol which can be selectively capped with a carboxyl capping agent in accordance with Applicant's co-pending application Ser. No. 06/919,076, filed Oct. 15, 1986, now U.S. Pat. No. 4,732,945. Such partial capping reaction is based on the discovery that carboxyl-functional capping agents bearing phenol and/or mercapto groups can be selectively reacted with epoxy groups in the presence of primary and/or secondary aliphatic hydroxyl groups. The reaction is reproduceable, even at commercial scale operations, and the distribution of functionality can be regulated quite closely.

Finally, a blend of polyol and epoxy material (or epoxyol for that matter) can be subjected to the partial capping step of the synthesis for producing a variety of unique resinous products as set forth for structures V—VIII. Of course, such materials can be separately capped and then blended if necessary, desirable, or convenient. For this step of the systhesis, all of the foregoing comments apply with respect to the production of a resinous mixture which predominates in the formation of adducts as set forth with the noted structures. In summary, it will be appreciated that the partial capping step of the synthesis possesses flexibility for specially designing adducts which can be isocyanate chain extended or flexibilized by the next step of the synthesis.

Isocyanate chain extension, for present purposes, involves the reaction of the above-synthesized adduct with a polyisocyanate for improving the flexibility of an adduct material of weight equivalent to the chain extended product. Aromatic, aliphatic, or mixed aromatic/aliphatic isocyanates may be used. Such isocyanates may be monomeric, oligomeric, or polymeric, or can be alcohol-modified or otherwise modified and find utility in the invention. Polyisocyanates preferably will have from about 2-5 isocyanate groups per molecule for use in chain extended the adducts of the present invention. Suitable polyisocyanates for use in the present invention include, for example hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl)thiophosphate, cyclohexane diisocyanate (CHDI), bis-(isocyanatomethyl)cyclohexane ($H_6XDI$), dicyclohexylmethane diisocyanate ($H_{12}MDI$), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof.

Reaction conditions for the isocyanate chain extension step of the synthesis broadly can range from about 50° to 120° C. with temperatures of about 80°-90° C. being typical. Higher temperatures are not desired because of the opportunity for allophanate production. If reaction temperatures are too low, then reaction times become too protracted for economic commercial practice of the present invention. Of course, non-basic urethane catalysts (e.g. dibutyltin dilaurate) can be utilized in the chain extension step of the process in order to curtail reaction times. The use of basic catalysts, however, is to be avoided in order to ensure the high selectivity of reaction of isocyanate functionality with the aliphatic hydroxyl groups of the adducts over the phenolic or mercapto groups of the adducts.

A solvent or vehicle may be included in one or both steps of the synthesis as is necessary, desirable or convenient. Solvents may be aromatic, aliphatic, or a blend, the choice being determined readily by those skilled in the art. Representative solvents include, for example, methyl ethyl ketone, acetone, butyl acetate, methyl amyl ketone, methyl isobutyl ketone, ethylene glycol monoethyl ether acetate (sold under the trademark Cellosolve acetate), toluene, xylene, and the like and mixtures thereof.

The resinous product has a variety of uses in formulating products including, for example, coating compositions, caulks, adhesives, sealants, foundry binders, or the like. Final formulation, then, can include opacifying pigments and inert extenders, tinctorial pigments, corrosion-inhibiting pigments, plasticizers, flow and leveling agents, surfactants, pigment dispersants, and the like. Additionally, use of the tin or bismuth complex catalyst as set forth in co-pending application Ser. No. 06/931,610, filed Nov. 17, 1986, also can be utilized. Such catalyst complex comprises the reaction product of a metal catalyst selected from a tin catalyst, a bismuth catalyst, and mixtures thereof; and a molar excess of a complexing agent selected from a mercapto compound, a polyphenol characterized by being reactable with an isocyanate group in the presence of a tertiary amine activator, and mixtures thereof. In fact, such complex catalysts may find use in the chain extension step of the process when all-aliphatic isocyanate extending agents are used.

A present preferred use for the resinous products is in formulating flexible primers for use on flexible plastic substrates, such as RIM substrates. The primer can be cured advantageously in accordance with vapor permeation curing techniques as disclosed in, for example, commonly-assigned, co-pending application Ser. No. 06/905,700, filed Sept. 9, 1986, and U.S. Pat. Nos. 4,517,222 and 4,368,222.

In this application, all percentages and proportions are by weight, unless otherwise expressly indicated. All citations referred to herein are expressly incorporated herein by reference.

IN THE EXAMPLES

Example 1

An isocyanate-chain extended polyester-based resin was synthesized in accordance with the two-step reaction procedure disclosed herein. The partial capping step reaction was conducted initially by the formation of a reaction mixture comprising K-Flex 148 polyester polyol (OH #=235, King Industries, 955 g), diphenolic acid (572 g), and hypophosphorous acid (50% strength, 3 g). This reaction mixture was heated at 200° C. for three hours with sufficient xylene solvent added thereto for obtaining a good azeotropic flow (38 g of water removed during the course of the reaction). Following termination of the reaction, residual xylene was removed by vacuum stripping and the product cooled to 130° C.

A butyl acetate/methyl n-amyl ketone solvent blend (2/1 by volume, 490 g) was added to the cooled product. The resultant clear, amber partially capped resin solution 4603-14 had the following physical constants: hydroxy number=168, acid value=3.8, 75.8% non-volatile solids content, 0.04% water, Gardner Color=5-, viscosity=27.6 stokes, and density=9.05 lb/gal.

Chain extension of the partially capped polyester polyol involved heating resin solution 4603-14 (1001.8 g) under a dry nitrogen blanket to 80° C. Toluene diisocyanate (78.3 g) was added dropwise to the heated resin solution followed by the addition of butyl acetate solvent (100 g). The resulting clear solution was heated at 80° for six hours to complete the reaction. The final reaction product 4603-16 had the following physical constants: hydroxy number=170, acid value=4.3, 84.8% non-volatile solids content, 0.03% water, Gardner Color=1, viscosity=22.9 stokes, and density=8.97 lb/gal. Thus, a highly selective reaction sequence has been demonstrated to produce a flexibilized phenol-functional resin.

Example 2

The partial capping reaction in this example was initiated by the formation of a reaction mixture of Tone 0310 triol (a polycaprolactone-based triol, OH number=186, Union Carbide Corporation, 905 g), diphenolic acid (286 g), and hypophosphorous acid (50% strength, 2 g). Sufficient toluene to obtain a good azeotropic reflux was added to the reaction mixture and heating conducted at 180° C. for about 8.5 hours. 16.2 g of water were removed during the reaction. Residual toluene was removed by vacuum stripping and the partially-capped polyester cooled to 150° C. whereupon methyl-n-amyl ketone (207 g) was added thereto. The resulting clear, light-colored resin solution 4431-153 had the following physical constants: hydroxy number=170, acid value=4.3, 84.8% non-volatile solids content, 0.03% water, Gardner Color=1, viscosity=22.9 stokes, and density=8.97 lb/gal.

Chain extension of resin solution 4431-153 involved its (660 g) heating to 80° C. under a dry nitrogen blanket. Toluene diisocyanate (43.5 g) in butyl acetate solvent (100 g) was added dropwise to the heated resin solution. The resulting clear solution then was heated at 80° C. for 4.5 hours to complete the reaction. Butyl acetate solvent (50 g) was added to the reaction product following the termination of the reaction heating. The resulting resin solution 4431-158 had the following physical constants: hydroxy number=100, acid value=3.1, 71.3% non-volatile solids content, 0.08% water, viscosity=20.1 stokes, Gardner Color=1, and density=8.80 lb/gal. Again, a uniquely selective reaction sequence has been demonstrated to produce a flexibilized, phenol-functional resin.

Example 3

Additional polyester polyol resins were selectively capped with diphenolic acid in accordance with the procedure set forth in Example 1. About 50 mole-% of the aliphatic hydroxyl groups on each resin were capped with diphenolic acid capping agent. The following table sets forth the identity of the polyester polyol resins and the physical constants of the partially-capped products.

TABLE I

| Adduct No. | Polyester Polyol[1] | Physical Constants[2] | | |
|---|---|---|---|---|
| | | OH# | Acid Value | % Non-Volatiles |
| 4603-12 | Tone 0200 | 174 | 5.4 | 78.3 |
| 4603-25 | Tone 0210 | 123 | 5.7 | 77.3 |

[1] Tone 0200 polycaprolactone-based diol, OH# = 215, Union Carbide Corp.
Tone 0210 polycaprolactone-based diol, OH# = 135, Union Carbide Corp.
[2] Cut solvent blend of butyl acetate/methyl amyl ketone (2/1 volume).

The partially-capped polyester resins then were subjected to the isocyanate chain extension step of the process in accordance with the reaction procedure set forth in Example 1. The following table sets forth the results of the chain extension reaction.

TABLE 2

| Product No. | Adduct No. | Isocyanate* | Product Physical Constants | | | |
|---|---|---|---|---|---|---|
| | | | OH# | Acid Value | % Non-Volatiles | % H$_2$O |
| 4603-15 | 4603-12 | TDI | 102 | 4.5 | 71.4 | 0.03% |
| 4603-27 | 4603-25 | TDI | 77.3 | 4.7 | 71.5 | 0.01% |
| 4603-30 | 4603-25 | HDI | 82.6 | 4.8 | 73.3 | — |

*TDI is toluene diisocyanate.
HDI is 1,6-diisocyanatohexane, 0.0005 parts/100 parts of resin solids dibutyltin dilaurate catalyst used.

About 90 mole-% of the primary hydroxyl groups on the partially-capped resins were reacted with the isocyanates during the isocyanate chain extension step of the process. Again, a highly selective reaction procedure has been demonstrated.

Example 4

Chain extended resin 4431-158 of Example 2 was formulated into a clear coating composition as follows:

TABLE 3

Coating 4431-159A

| Ingredient* | Amount |
| --- | --- |
| Resin 4431-158 | 56.1 g(0.1 eq.) |
| Butyl acetate solvent | 40.0 g |
| Desmodur N-3390 Isocyanate | 23.1 g(0.11 eq.) |
| FC-430 | 6 drops(25% in methyl ethyl ketone) |

*Desmodur N-3390, a hexamethylene diisocyanate trimer in ethyl acetate solvent at 90% solids, Mobay Chemical Co.
FC-430, a non-ionic fluorocarbon surfactant, Minnesota Mining & Manufacturing Company.

The coating was spray catalyst applied onto glass and Bonderite 1000 panels at about 1 mil dry film thickness in accordance with the process of U.S. Pat. No. 4,517,222. Dimethyl ethanol amine catalyst in the spray process was at a volumetric concentration of about 0.5%. After a two-minute flash, the coated panels were baked in an oven for 5 minutes at 250° F. The following coating properties then were recorded:

TABLE 4

| Test | Result |
| --- | --- |
| Tack free hot (from oven) | Yes |
| MEK double rubs-1 hr after bake | 100+ |
| MEK double rubs-24 hrs after bake | 100+ |
| Sward hardness-24 hrs after bake | 5,4 |
| Reverse impact/tape-off | 100/100 inch-lbs. |
| Conical mandrel | Pass(0.0 inch) |

In addition to the foregoing test results, the coating composition had a pot life in excess of 6 days. Thus, it will be observed that the flexibilized, partially-capped resin synthesis has produced a resin which maintains a good balance of pot life and performance properties.

Example 5

The partial capping step of the reaction synthesis was initiated by the formation of a reaction mixture of Cardure E (a glycidyl ester of Versatic 911 acids which are a mixture of aliphatic, mostly tertiary acids with 9–11 carbon atoms, Shell Chemical Co., 245 g or 1 mole), diphenolic acid (286 g or 1 mole), and dry methyl-n-amyl ketone solvent (200 g). The reaction mixture was heated at 150° C. for 2 hours to yield an amber solution 4603-59 which was determined to have the following physical constants. Hydroxy number=243, acid value=5.1, 72.3% non-volatile solids content, and less than 0.01% water.

Resin solution 4603-59 (230.8 g) was chain extended by the addition of 1,6-diisocyanatohexane (26.3 g), and butyl acetate solvent (25 g containing 0.025 g of dibutyl-tin dilaurate catalyst). The solution was heated at 95° C. under a nitrogen blanket for six hours. The resulting clear, amber resin solution 4603-98 (95 mole-% chain extended) was determined to have the following physical constants: hydroxy number=141, acid value=1.7, 70.2% non-volatile solids content, and 0.05% water. This flexibilized partially-capped resin has been determined to be especially useful in formulating flexible coating compositions for priming reaction injection molding urethanes (RIM urethane products).

Example 6

A clear coating was formulated from resin solution 4603-98 of Example 5 as follows:

TABLE 5

Coating 4603-99B

| Ingredient | Amount |
| --- | --- |
| Resin 4603-98 | 39.8 g(0.1 eq) |
| Butyl acetate solvent | 15.0 g |
| VIC 5014 Isocyanate* | 38.0 g(0.107 eq.) |
| FC-430 | 4 drops(25% in MEK) |

*26.35% Desmodur HL-an approximately tetrafunctional reaction product of hexamethylene diisocyanate and toluene diisocyanate (11.5% NCO content, equivalent weight of 365, 60% solids in butyl acetate, Mobay Chemical Corp.)
46.65% Desmodur N-3390
21.48% Methyl iso-butyl ketone
6.52% Hexyl acetate Coating 4603-99B was spray catalyst applied (0.5 vol.-% dimethyl ethanol amine catalyst) onto Bonderite 1000 panels. One of the panels was permitted to air dry while the other panel was subjected to a 5 minute flash followed by baking for 10 minutes at 180° F. Thereafter, the following properties of the applied coatings were recorded.

TABLE 6

| Test | Air-Dry Panel | Baked Panel |
| --- | --- | --- |
| Tack free oven | — | Yes |
| Pencil hardness at 1 hour | Tacky | B |
| MEK double rubs at 1 hour | Tacky | 100+ |
| Pencil Hardness at 24 hours | H | H |
| MEK double rubs at 24 hours | 100+ | 100+ |
| Reverse impact/tape-off at 24 hr hours | — | 100/100 inch-lbs |
| Conical mandrel | — | Pass(0.0 in.) |

The above-tabulated results demonstrate that the flexibilized, partially-capped resin was ideally suited for rapid curing at room temperature. The response to the amine catalyst clearly is demonstrated by the comparative air dry panel. Were such air dry panel permitted to stand for a sufficient length of time, though, full cure of the applied coating eventually would ensue.

Example 7

A partial capping synthesis in accordance with the procedure of Example 1 was conducted utilizing the following ingredients: Tone 0210 polycaprolactone diol (1245 g), Cardura E glycidyl ester (125 g), diphenolic acid (572.6 g), and hypophosphorous acid (50% concentration, 2 g). The reaction product was cut with butyl acetate/methyl n-amyl ketone (2/1 by volume, 664.4 g). The resulting clear, amber solution had the following physical constants: hydroxy number=136, acid value=3.4, and 72.5% non-volatile solids content. To the foregoing resin solution was added toluene diisocyanate (156.6 g or 0.9 mole) and butyl acetate solvent (156.6 g). The solution was heated at 60° C. for 15 hours to produce partially-capped, isocyanate chain extended resin 4583-127 which had the following physical constants: hydroxy number=93.2, acid value=3.4, 71.1% non-volatile solids content, and 0.15% water. Again, the unique synthesis scheme of the present invention is demonstrated.

Example 8

A clear coating suitable for use on RIM substrates was formulated from resin solution 4603-30 of Example 3 as follows:

TABLE 7

| Coating 4474-165-3 | |
|---|---|
| Ingredient | Amount |
| Resin 4603-30 | 67.9 g |
| VIC 5014 Isocyanate | 35.8 g |
| Dibutyltin dilaurate catalyst* | 1.76 g |
| Solvent blend** | 59.0 g |

*T-12 brand, M & T Chemicals, 10% by weight in ethyl 3-ethoxypropionate (EEP)
**Solvent blend:
25% Hi-SOL 10 aromatic solvent (Ashland Chemical Co.)
35% Hexyl acetate
3% Diethylene glycol mono-butyl ether Acetate
15% Methyl iso-butyl ketone
10% Methyl ethyl ketone The coating was spray catalyst applied (0.5 vol-% dimethyl ethanol amine catalyst) to clear RIM urethane panels. For analysis purposes, the panels then were baked for 30 minutes at 280° F. in order to assure complete cure of the coating. The dry film thickness was adjudged to be about 1.2 mils and had a pencil hardness of F. The coating additionally was subjected to a −20° F. cold flex test utilizing a 0.5 in. mandrel and to a cross-hatch adhesion test. The clear coating passed both of these tests. Again, the efficacy of the inventive resin synthesis procedure is validated.

Example 9

A primer for RIM urethane substrates was prepared from resin solution 4603-27 of Example 3. A conventional two-pack system was formulated wherein the Part A polyol was shaken in a steel tube with ⅛ inch steel shot until a 6+ Hegman grind was achieved. Thereafter, the Part B isocyanate portion of the coating was incorporated into the Part A grind. The following table sets forth the composition of the primer.

TABLE 8

| Coating 4591-31-2 | |
|---|---|
| Ingredient | Amount |
| Part A | |
| Resin 4603-27 | 42.0 g |
| Methyl amyl ketone | 14.0 g |
| Ethyl 3-ethoxypropionate | 24.0 g |
| Raven Black 1255(1) | 3.0 g |
| Barytes #1 | 20.0 g |
| Lonza KS-25(2) | 1.6 g |
| Baylith L powder(3) | 1.0 g |
| Part B | |
| VIC 5014 Isocyanate | 20.7 g |
| Methyl iso-butyl ketone | 5.0 g |
| Viscosity: 19.8 sec(#4 Ford Cup) | |

(1)Raven Black 1255 is a carbon black supplied by Columbian Chemical Company, a subsidiary of Cities Chemical Company.
(2)Lonza KS-25 graphite, Lonza Inc.
(3)Baylith L zeolite based moisture scavenger, Mobay Chemical Co.

The primer was spray catalyst applied (0.5 vol.-% dimethyl ethanol amine catalyst) on clear RIM urethane panels. For analysis purposes, the panels then were baked at 280° F. for 30 minutes in order to assure complete cure of the coating. The cured coatings were found to have a dry film thickness of about 1.1 mils and possessed a pencil hardness of HB.

The primed panels then were top-coated with a black acrylic-melamine topcoat for RIM urethane substrate (Bee Chemical Company, 1724A Black Coating) and baked for 30 minutes at 240° F. The properties of the cured black topcoat over the primer were as follows: dry film thickness of 1.6 mils; 95 MEK double rubs; pencil hardness of 2B; passes the cross-hatch adhesion test; and marginally passes (recovers) from a −20° F. cold flex (½ inch mandrel) test. Thus, it will be seen that the primer made from the resin synthesized in accordance with the novel reaction synthesis possesses requisite properties including flexibility for use as a primer on RIM urethane substrate. Importantly, also, is the performance of the topcoat which is applied over the primer. That is, the success of the primer is not independently determined, but is determined by the performance of the finally-prepared (i.e. topcoated) substrate.

Example 10

A partially mercapto-capped adduct 4603-101 was prepared in accordance with the procedure detailed in Example 5 from Cardura E epoxy ester (245 g), dry methyl n-amyl ketone (150 g), and 3-mercapto propionic acid (106 g). The resulting adduct 4603-101 possessed the following physical constants: hydroxy number=219, acid value=16.2, and 70% (theoretical) non-volatile solids content.

The adduct then was subjected to isocyanate chain extension by forming a reaction mixture of adduct 4603-101 (179.2 g) and toluene diisocyanate (27.4 g). This reaction mixture was heated at 90° C. for five hours to produce resinous solution 4603-105 which had the following physical constants: hydroxy number=107.5, acid value=13.0, and 72.1% non-volatile solids content. The foregoing example demonstrates the efficacy of the selective reaction procedure of the present invention in making flexibilized (i.e. chain extended) resins which are mercapto functional. Such resins also are suitable for use in formulating coating compositions such as were formulated in the prior examples.

I claim:

1. A method for improving the flexibility of a phenol or mercapto resin which comprises:

(a) reacting a component containing functionality selected from the group consisting of aliphatic hydroxyl functionality, epoxy functionality, or mixtures thereof, with a capping agent bearing functionality selected from phenol functionality, mercapto functionality, or mixtures thereof, and containing functionality reactive with said component to form a phenolic or mercapto functional adduct; and (b) reacting the adduct of the step (a) with a polyisocyanate in the substantial absence of a basic urethane catalyst, said reactants being present in a ratio to produce said resin predominating in one or more of the following general structures:

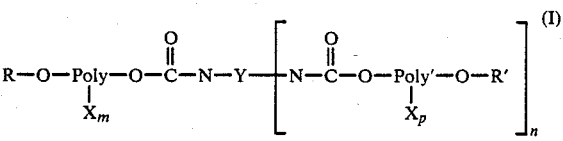

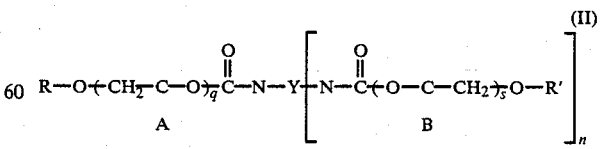

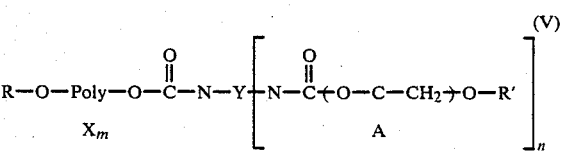

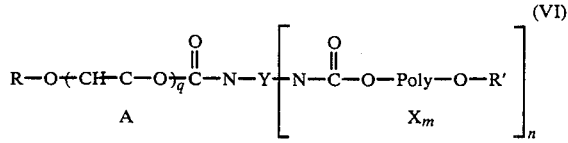

where,

R and R' each is a phenol functional group or a mercapto functional group,

A and B each is an organic chain residue of said component containing epoxy functionality, Poly and Poly' each is an organic chain residue of said component containing aliphatic hydroxyl functionality, X is an aliphatic hydroxyl group, the wavy line represents an organic chain residue of said polyisocyanate, n is 1–4, m and p each is 0–2, and q and s each is 1–15.

2. The method of claim 1 wherein said capping agent is selected from the group consisting of diphenolic acid, a hydroxybenzoic acid, thiosalicylic acid, mercapto acetic acid, mercapto propionic acid, parahydroxy phenyl acetic acid, and mixtures thereof.

3. The method of claim 1 wherein said polyisocyanate is selected from the group consisting of hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanate, bitolylene diisocyanate, triphenylmethane triisocyanate, tris(4-isocyanatophenyl) thiophosphate, cyclohexane diisocyanate (CHDI), bis-(isocyanatomethyl) cyclohexane (H₆XDI), dicyclohexylmethane diisocyanate (H₁₂MDI), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and mixtures thereof.

4. The method of claim 1 wherein Poly and Poly' are the same.

5. The method of claim 1 wherein R and R' are the same.

6. The method of claim 1 wherein A and B are the same.

7. The method of claim 1 wherein for a component containing aliphatic hydroxyl functionality, a reaction temperature ranging from about 150° to 230° C. is used.

8. The method of claim 1 wherein for a component containing epoxy functionality, a reaction temperature of about 75° to 175° C. is used.

9. The method of claim 1 wherein for step (b), said reaction temperature ranges from about 50° C. to 120° C.

10. The method of claim 1 wherein said ratio of reactants produces a resin predominating in one or more of the following general structures:

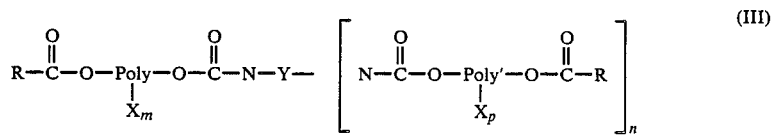

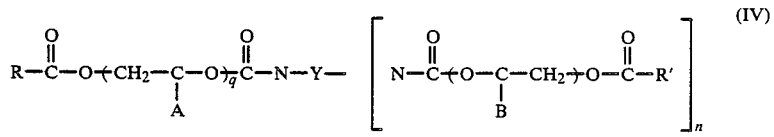

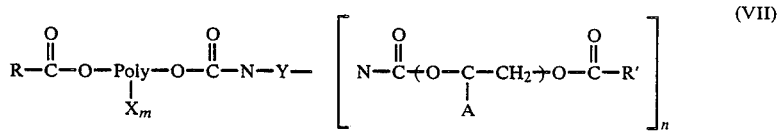

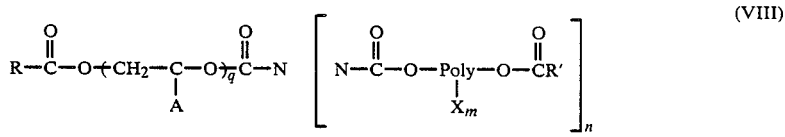

11. A flexibilized phenol or mercapto resin represented by one or more of the following general structures:

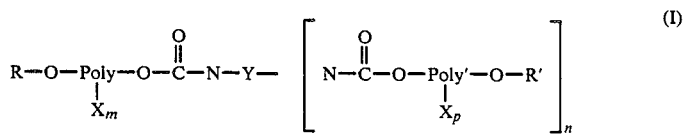

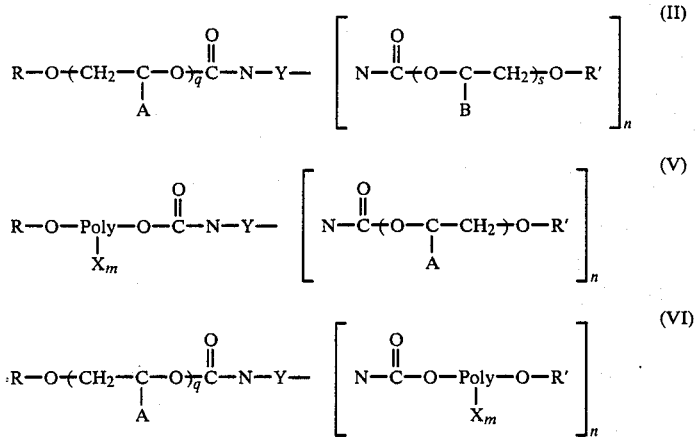

where,
- R and R' each is a phenol functional group or a mercapto functional group,
- A and B each is an organic chain residue of an epoxy component,
- Poly and Poly' each is an organic chain residue of an aliphatic hydroxyl component,
- X is an aliphatic hydroxyl group,
- the wavy line represents an organic chain residue of said polyisocyanate,
- n is 1–4,
- m and p each is 0–2, and
- q and s each is 1–15, said resin being synthesized by reacting a phenol or mercapto capping agent with an aliphatic hydroxyl component containing epoxy functionality or component, followed by reaction with a polyisocyanate in the substantial absence of basic urethane catalyst to produce said resin.

12. The resin of claim 11 wherein R and R' independently is a residue from a carboxyl capping agent selected from the group consisting of diphenolic acid, a hydroxybenzoic acid, thiosalicylic acid, mercapto acetic acid, mercapto propionic acid, para-hydroxy phenyl acetic acid, and mixtures thereof.

13. The resin of claim 11 wherein said wavy line represents an organic chain residue of a polyisocyanate selected from the group consisting of: hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6$XDI), dicyclohexylmethane diisocyanate ($H_{12}$MDI), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and mixtures thereof.

14. The resin of claim 11 wherein Poly and Poly' are the same.

15. The resin of claim 11 wherein R and R' are the same.

16. The resin of claim 11 wherein A and B are the same.